United States Patent
Jossem

(10) Patent No.: US 8,662,547 B2
(45) Date of Patent: Mar. 4, 2014

(54) LOCKING TONGS

(75) Inventor: Adam A. Jossem, Seattle, WA (US)

(73) Assignee: Chef'N Corporation, Seattle, WA (US)

(*) Notice: Subject to any disclaimer, the term of this patent is extended or adjusted under 35 U.S.C. 154(b) by 49 days.

(21) Appl. No.: 13/023,079

(22) Filed: Feb. 8, 2011

(65) Prior Publication Data

US 2011/0193364 A1     Aug. 11, 2011

Related U.S. Application Data

(60) Provisional application No. 61/302,875, filed on Feb. 9, 2010.

(51) Int. Cl.
*B65G 7/12* (2006.01)
*B65G 9/00* (2006.01)

(52) U.S. Cl.
USPC .......................................... 294/16; 294/99.2

(58) Field of Classification Search
USPC ........ 294/3, 16, 99.1, 99.2, 106, 8.5, 28, 118, 294/119; D7/393, 686; 292/DIG. 4, DIG. 37
See application file for complete search history.

(56) References Cited

U.S. PATENT DOCUMENTS

| | | | | |
|---|---|---|---|---|
| 2,864,645 | A | * | 12/1958 | Meldrum .................... 294/106 |
| 3,552,868 | A | | 1/1971 | Levoin |
| 6,056,338 | A | * | 5/2000 | Kerr .............................. 294/16 |
| 6,089,631 | A | | 7/2000 | Thurlow et al. ................ 294/16 |
| 6,092,847 | A | * | 7/2000 | Kwan ............................. 294/16 |
| 7,086,676 | B2 | | 8/2006 | Sumter et al. .................. 294/16 |
| 7,261,348 | B1 | | 8/2007 | Fried .............................. 294/16 |
| 7,311,344 | B2 | * | 12/2007 | Kerr et al. ..................... 294/16 |
| 7,316,434 | B1 | | 1/2008 | Kerr .............................. 294/16 |
| 7,448,660 | B2 | | 11/2008 | Yamanaka et al. ............. 294/16 |
| 8,256,808 | B2 | * | 9/2012 | Spellman ........................ 294/3 |
| 2004/0119297 | A1 | | 6/2004 | Bella et al. |
| 2008/0179903 | A1 | | 7/2008 | Tardif et al. .................... 294/16 |

FOREIGN PATENT DOCUMENTS

GB             747860         4/1956

* cited by examiner

*Primary Examiner* — Stephen Vu
(74) *Attorney, Agent, or Firm* — Seed IP Law Group PLLC

(57) ABSTRACT

Tongs including a pair of elongated arms coupled together to move between a generally compressed configuration and a generally expanded configuration. The tongs further include a locking mechanism having a frame, a lock member and a spring to bias the lock member away from the frame. The lock member being movably coupled to the frame to move between a first position in which the lock member allows movement of the arms to the expanded configuration and a second position in which the lock member prevents movement of the arms beyond an intermediate configuration between the expanded and compressed configurations.

11 Claims, 17 Drawing Sheets

LOCKING TONGS

CROSS-REFERENCE TO RELATED APPLICATION

This application claims the benefit under 35 U.S.C. §119(e) of U.S. Provisional Patent Application No. 61/302,875 filed Feb. 9, 2010, which is incorporated herein by reference in its entirety.

BACKGROUND

1. Technical Field

This disclosure is related to tongs for handling food items, and more particularly, to tongs having a spring-biased locking mechanism for controlling the degree to which the tongs can expand.

2. Description of the Related Art

Spring-biased tongs are commonly used to handle food items and other objects. In order to handle food items of various sizes, such tongs are generally configured to expand relatively wide. Consequently, the tongs can take up considerable amounts of space when not in use. Further, because the tongs are spring-biased towards a fully-open position, they can be difficult or cumbersome to use when handling or grasping relatively small food items or objects for which only a partially expanded position is needed. To address these concerns, some tongs include mechanisms for locking the tongs in a closed position or for limiting the degree to which the tongs can open. Examples of these tongs include those shown and described in U.S. Pat. Nos. 6,089,631; 7,086,676; 7,261,348; 7,316,434 and 7,448,660. However, while these tongs may provide some advantages with respect to storage and handling, the mechanisms for locking the tongs are prone to inadvertent disengagement and are cumbersome to operate.

BRIEF SUMMARY

The locking tongs described herein are particularly well suited for easily and efficiently transitioning between a state in which the tongs are able to fully expand and an alternate state in which expansion of the tongs is limited to an intermediate configuration between the fully expanded configuration and a fully compressed configuration. Advantageously, the locking tongs may be transitioned between such states with the sequential pressing and releasing of a push-button locking mechanism.

According to one embodiment, locking tongs may be summarized as having a pair of elongated arms coupled together to move between a compressed configuration in which a distal end of each arm is relatively close to the other and an expanded configuration in which the distal end of each arm is relatively far apart from the other; and a locking mechanism including a frame, a lock member and a spring to bias the lock member away from the frame, the lock member movably coupled to the frame to move between a first position in which the lock member allows movement of the arms to the expanded configuration and a second position in which the lock member prevents movement of the arms beyond an intermediate configuration between the expanded and compressed configurations. The lock member may include a shoulder portion on each of a first and a second side of the lock member, each shoulder portion positioned to impede the path of a respective one of the arms to prevent movement of the arms beyond the intermediate configuration when the lock member is in the second position. The locking mechanism may include a latch and the lock member may be adapted to alternately guide the latch between an unlatched configuration and a latched configuration as the lock member moves to and is released from a fully depressed position.

According to one embodiment, a locking mechanism may be summarized as having a frame, a lock member movably coupled to the frame and a latch that is movable to alternate between an unlatched configuration and a latched configuration as the lock member moves to and is released from a fully depressed position. When the latch is in the latched configuration, a distal end of the latch may abut a seat portion of the lock member to locate the lock member at the intermediate position between the fully depressed position and a fully extended position. The lock member may include a partition for preventing the distal end of the latch from retreating when the latch is moved away from the seat portion. The lock member may include a catch adapted to guide or keep the latch to a first side of the catch when the lock member moves from the fully extended position to the fully depressed configuration and guide the latch towards the seat portion when the lock member is released therefrom. The lock member may include a ramp for displacing the distal end of the latch away from a central plane of the lock member as the latch is guided to the first side of the catch. The lock member may include a ramp for displacing the distal end of the latch away from a central plane of the lock member as the lock member approaches the fully extended position. The lock member may include a diverting portion that is adapted to guide the latch away from the first side of the catch when the lock member moves from the intermediate position to the fully depressed position. The lock member may include a partition to prevent the latch from returning to the intermediate position after the latch is guided away from the first side of the catch. The latch may be an integral portion of the frame or movably coupled to the frame.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with tongs and other food handling tools have not been shown or described in detail to avoid unnecessarily obscuring descriptions of the embodiments.

Figure 1:
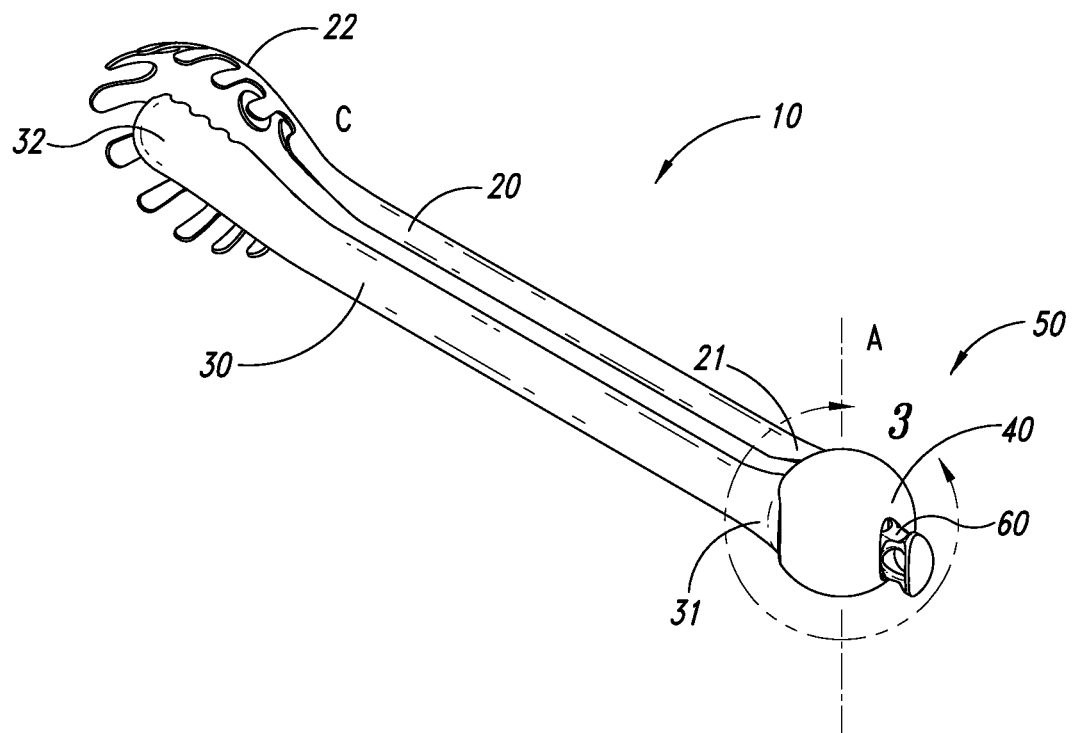
FIG. 1 is an isometric view of tongs having a locking mechanism, according to one embodiment.

FIG. 1 illustrates locking tongs 10 according to one embodiment which includes a pair of elongated arms 20, 30. Each arm 20, 30 has a respective proximal end 21, 31 and a respective distal end 22, 32. The arms 20, 30 are coupled together at the respective proximal ends 21, 31 to rotate about a central axis of rotation A. At the respective distal ends 22, 32, the arms 20, 30 include grasping or gripping structures. In some embodiments, the distal ends 22, 32 of one or both arms 20, 30 may include other common tong structures, such as, for example, tines or spatula structures. In addition, the distal ends 22, 32 may include a covering, layer or section of an alternate material, such as, for example a silicone based covering over metallic arms.

The tongs 10 further include a housing 40 concealing a portion of the proximal ends 21, 31 of the arms 20, 30 and surrounding a locking mechanism 50. A lock member 60 of the locking mechanism 50 protrudes from the housing 40 so as to be accessible to a user of the tongs 10.

Figure 2:
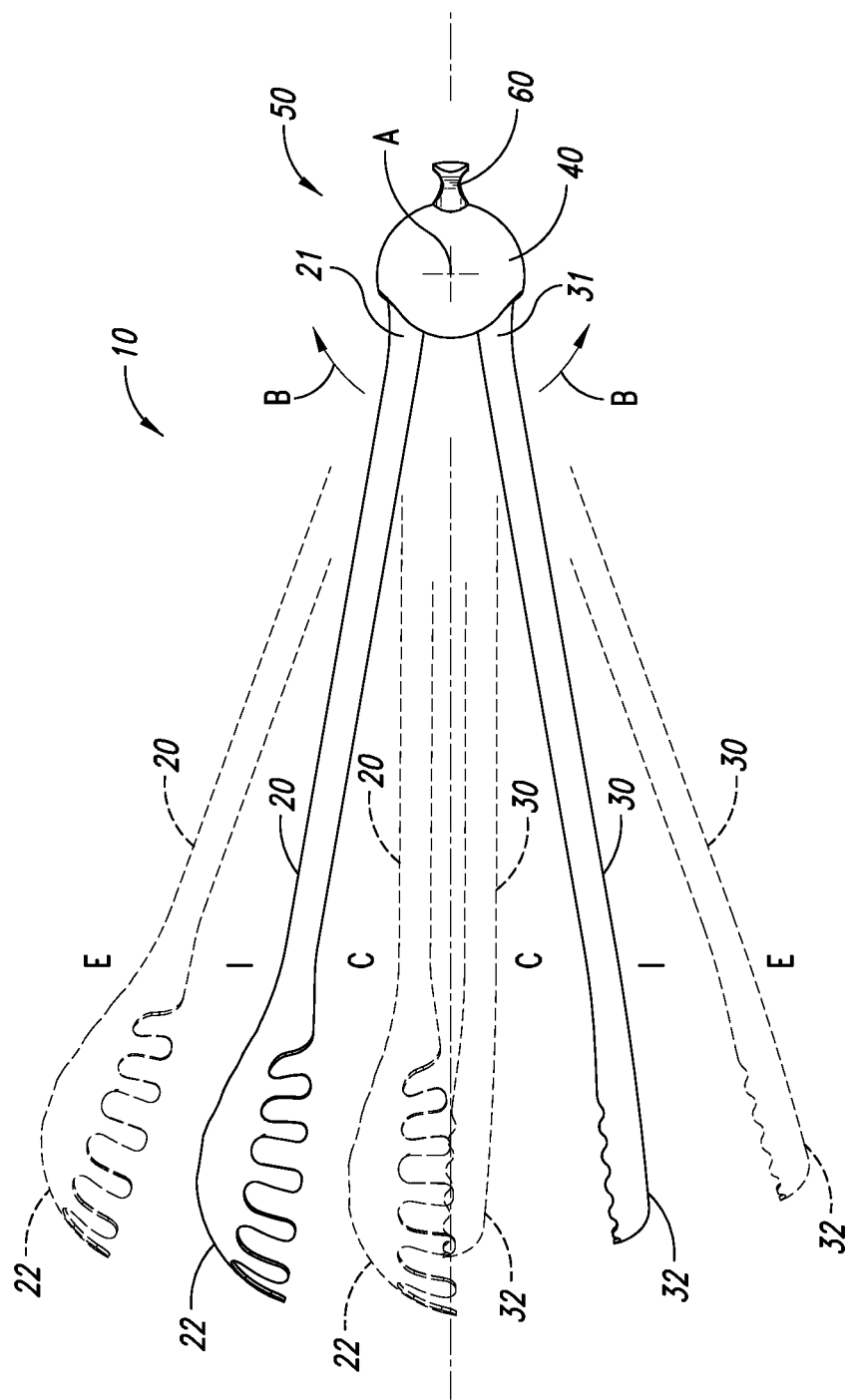
FIG. 2 is a side elevational view of the tongs of FIG. 1, illustrating the range of motion of the tongs.

With reference to FIG. 2, the arms 20, 30 are configured to move between a fully compressed configuration C in which the distal ends 22, 32 of the arms 20, 30 are relatively close together and an expanded configuration E in which the distal ends 22, 32 are relatively far apart. The arms 20, 30 are biased apart as indicated by the arrows labeled B such that the arms 20, 30 are urged towards the expanded configuration E throughout operation. In this manner, a user can selectively apply pressure to the arms 20, 30 to bring them closer together, and conversely, relieve or release pressure from the arms 20, 30 to allow them to return towards the expanded configuration E. As discussed in more detail below, the locking mechanism 50 is retained within the housing 40 and is configured to selectively limit the range of motion of the arms 20, 30 to an intermediate configuration I between the fully compressed configuration C and the fully extended configuration E.

Figure 3A:
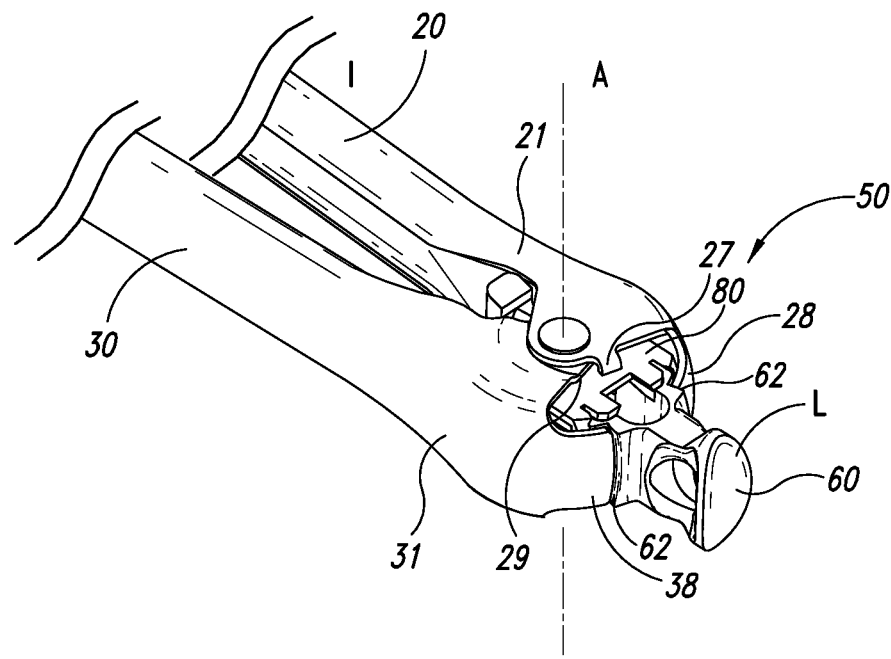
FIG. 3A is a detail isometric view of the tongs of FIG. 1, shown with the locking mechanism in a locked position and a housing removed.
Figure 3B:
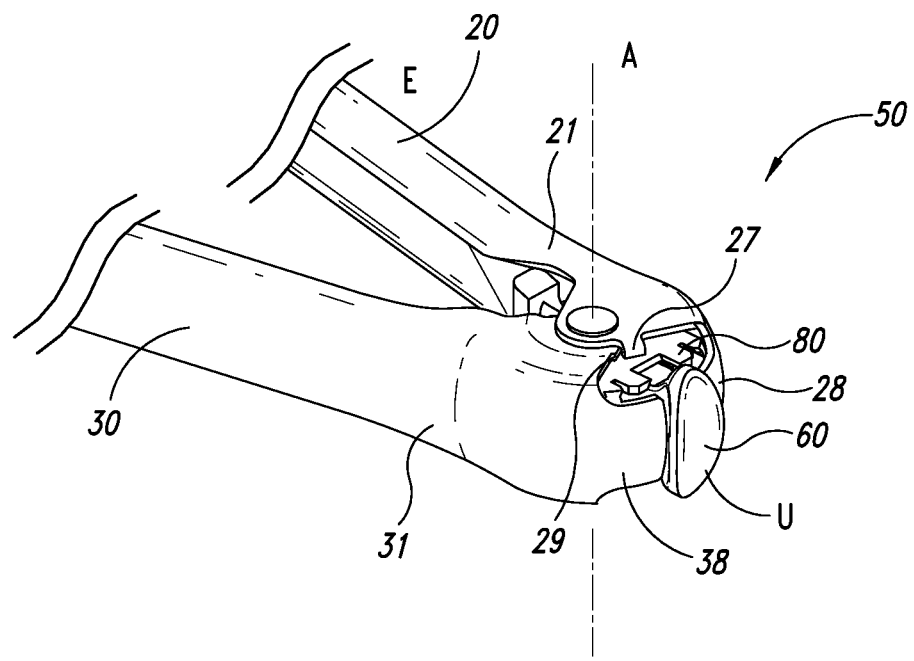
FIG. 3B is a detail isometric view of the tongs of FIG. 1, shown with the locking mechanism in an unlocked position and a housing removed.

FIGS. 3A-3B show the tongs 10 with the housing 40 removed to reveal further details of an example locking mechanism 50. As illustrated, the locking mechanism 50 comprises the lock member 60 and a frame 80. The lock member 60 is movably coupled to the frame 80 to move between a locked position L, as shown in FIG. 3A, and an unlocked position U, as shown in FIG. 3B. When in the locked position L, a shoulder portion 62 on each side of the lock member 60 is positioned to impede the path of a respective arm 20, 30 as the arms 20, 30 are urged towards the expanded configuration E. More particularly, a rear portion 28, 38 of each arm 20, 30 is configured to abut the respective shoulder portion 62 of the lock member 60 to limit the tongs 10 from expanding beyond the intermediate configuration I. Conversely, when in the unlocked position U, the lock member 60 and hence shoulder portions 62 are displaced inwardly towards the central axis A so as to no longer impede the path of the arms 20, 30. Accordingly, the arms 20, 30 are able to open to the fully expanded configuration E.

A tab stop 27 or similar structure may be formed integrally with one or both of the arms 20, 30 to limit the range of motion of the arms 20, 30 to the expanded configuration E. For example, as shown in FIG. 3B, a tab stop 27 is formed along a back edge of one of the arms 20 and is positioned and sized to abut a portion 29 of the other arm 30 when reaching the fully expanded configuration E. In other embodiments, the arms 20, 30 may not include a tab stop 27 and may instead abut portions of the lock member 60 or frame 80 when the locking mechanism 50 is in the unlocked position U.

In either case, the locking mechanism 50 limits the arms 20, 30 from moving beyond the intermediate configuration I when the lock member 60 is in the locked position L, and conversely, allows the arms 20, 30 to move to the fully expanded configuration E when the lock member 60 is in the unlocked position U. However, in other embodiments, the opposite may be true. That is, the arms 20, may be configured to travel to the expanded configuration E when the lock member 60 is in the locked position L and limited from moving beyond the intermediate configuration I when the lock member 60 is in the unlocked position U.

FIGS. 4 through 8 illustrate further details of one example embodiment of a locking mechanism 150 for tongs 110.

Figure 4:
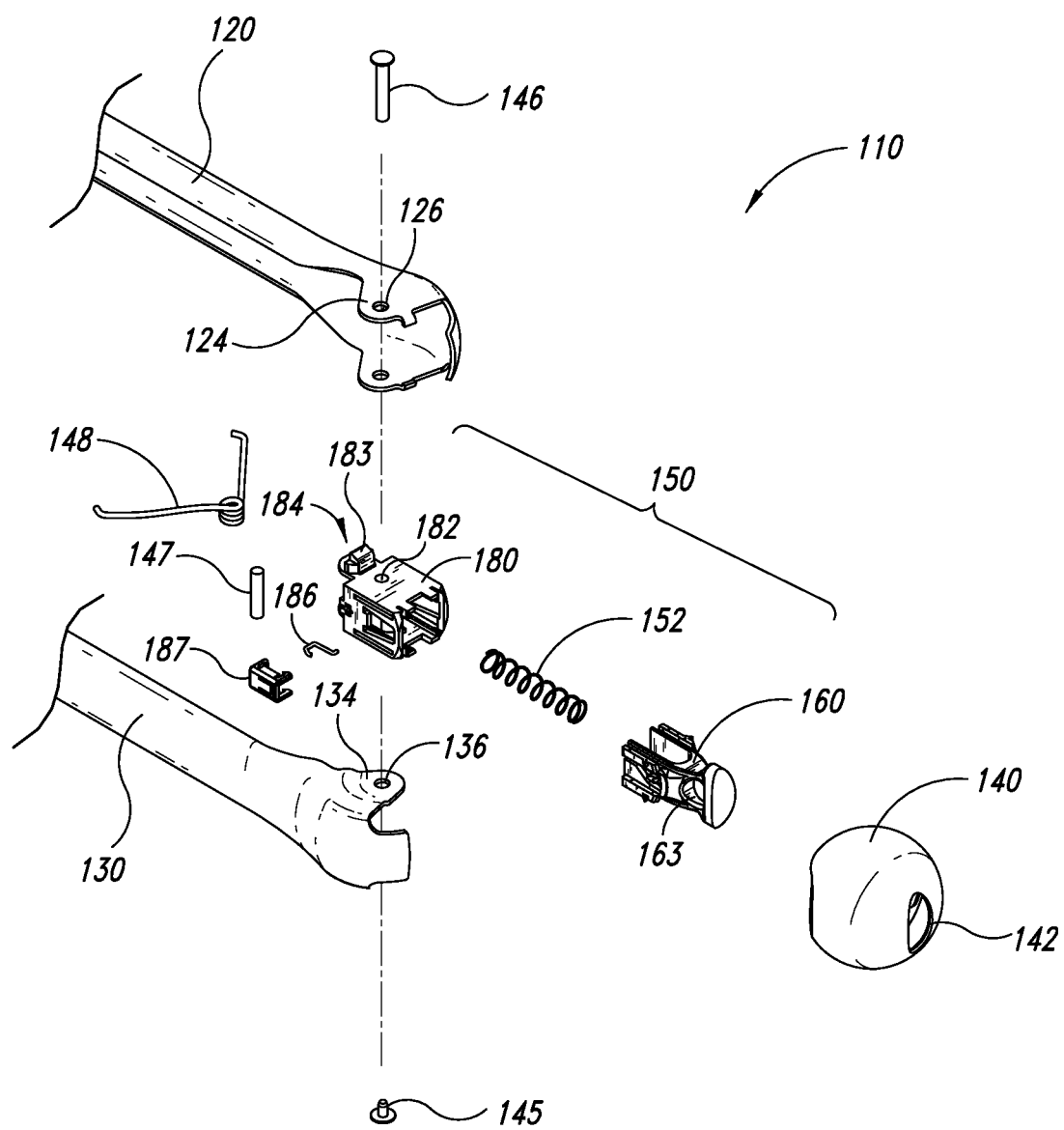
FIG. 4 is an exploded isometric view of tongs having a locking mechanism, according to one embodiment.

As can be appreciated from FIG. 4, a locking mechanism 150 is coupled to arms 120, 130 of the tongs 110 via a pivot pin member 146 and fastener 145. More particularly, the pivot pin member 146 and fastener 145 are coupled to the arms 120, 130 via pivot apertures 126, 136 in flanged mounting portions 124, 134 thereof, and coupled to a frame 180 of the locking mechanism 150 via a frame mounting aperture 182.

The frame 180 further includes a spring retention aperture 184 for receiving a spring retention pin 147. The spring retention pin 147 is provided to retain a first spring 148 between the arms 120, 130 of the tongs 110 for biasing the arms 120, 130 apart throughout operation. A second spring 152 is received between the frame 180 and a lock member 160 of the locking mechanism 150. The second spring 152 biases the lock member 160 away from the frame 180 such that the lock member 160 is urged towards an extended configuration. The frame 180 also includes projections 183 that space the frame 180 within a housing 140 such that the lock member 160 aligns with an access opening 142 therein. The projections 183 may be configured to snap or click into recesses (not visible) provided in the shell of the housing 140. When assembled, the lock member 160 extends through the opening 142 when in at least one configuration so as to be accessible to a user. An aperture 163 is provided in the lock member 160 such that when the lock member 160 extends through the opening 142, the tongs 110 may be hung from a hook or the like for storage purposes.

Figure 5:
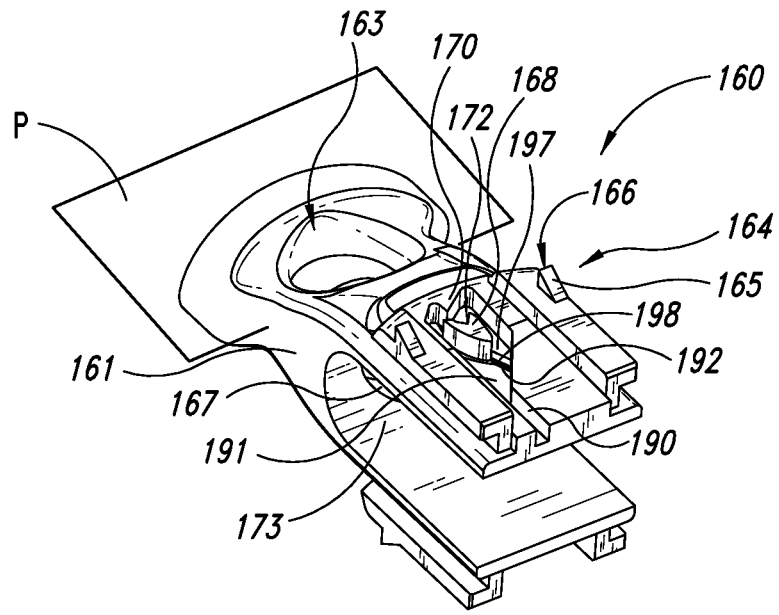
FIG. 5 is an isometric view of a lock member of the locking mechanism of the tongs of FIG. 4.
Figure 6:
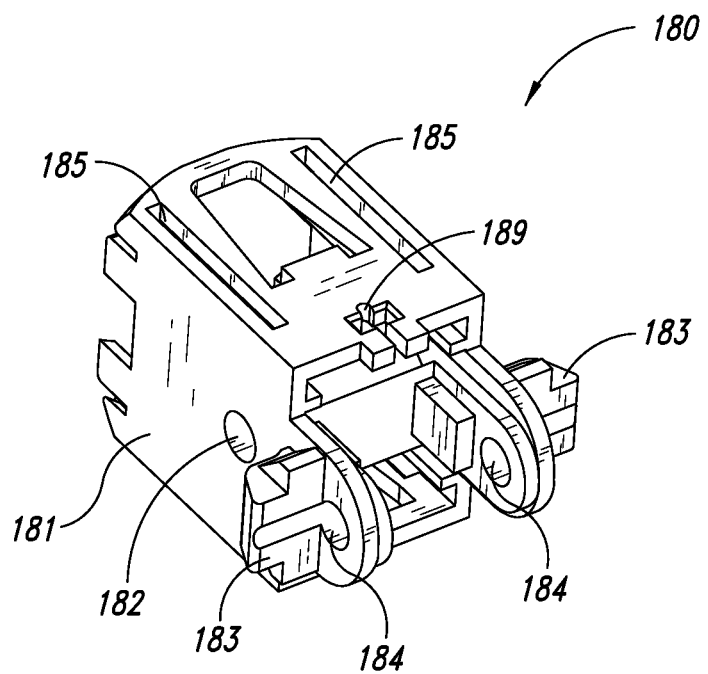
FIG. 6 is an isometric view of a frame of the locking mechanism of the tongs of FIG. 4.

FIGS. 5 and 6 show further details of the lock member 160 and the frame 180, respectively. As illustrated, a body 161 of the lock member 160 and a body 181 of the frame 180 are correspondingly sized and shaped to slidably couple together. Protrusions 164 are provided on the lock member 160 and positioned to align with correspondingly shaped slots 185 on the frame 180. In operation, the protrusions 164 ride in the slots 185 to assist in alignment of the lock member 160 with respect to the frame 180. The protrusions 164 include sloped outer surfaces 165 to facilitate initial insertion of the lock member 160 in the frame 180. A backside 166 of the protrusions 164 is adapted to keep the lock member 160 from exiting the frame 180 once the lock member 160 and frame 180 are assembled. In the illustrated embodiment, the lock member 160 includes a spring cavity 167 for receiving one end of the second spring 152 (FIG. 4) while a corresponding spring cavity (not visible) is provided on the frame 180 for receiving the other end. In alternate embodiments, the second spring 152 may be rigidly secured to the lock member 160 and/or frame 180 by appropriate fasteners. A latch 186 is coupled to the frame 180 by an attachment device, such as, for example a clip 187. The clip 187 snaps onto the frame 180 with the latch 186 received therebetween such that the latch 186 is movably coupled to the frame 180. In particular, the clip 187 may interoperate with the frame 180 to constrain the latch 186 within groove 189 or aperture of the frame 180 such that the latch 186 may pivot within the groove 189 or aperture.

A catch 168 is located on one side of the lock member 160. In an assembled condition, the catch 168 and other structures of the lock member 160 align and interoperate with the latch 186 to transition the locking mechanism between an unlatched configuration (FIG. 7A) and a latched configuration (FIG. 7E) as the lock member 160 is sequentially pressed and released by a user as described in further detail below.

Figure 7A:
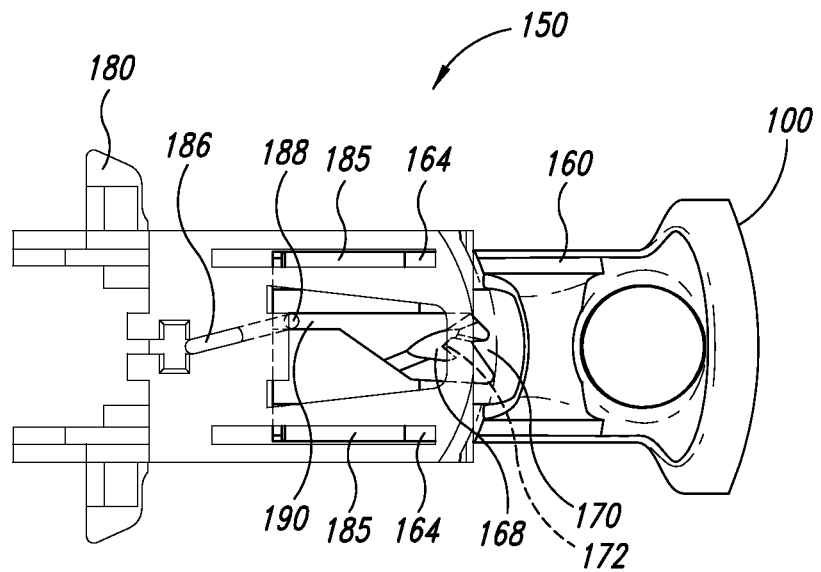
FIGS. 7A-7H are side elevational views of the lock member and the frame of the locking mechanism of the tongs of FIG. 4 shown in various positions relative to each other.

Further operational details of the locking mechanism 150 are discussed with reference to FIGS. 7A-7H. As illustrated in FIG. 7A, the lock member 160 is initially biased to a fully extended position 100 in which protrusions 164 of the lock member 160 are located at an extreme end of the slots 185 of the frame 180. In this position, the catch 168 of the lock member 160 is spaced from a distal end 188 of the latch 186 and the latch 186 remains in a groove 190 offset to one side of the catch 168. This is referred to as the unlatched position or unlatched configuration and corresponds to the locked position L discussed earlier.

Figure 7B:
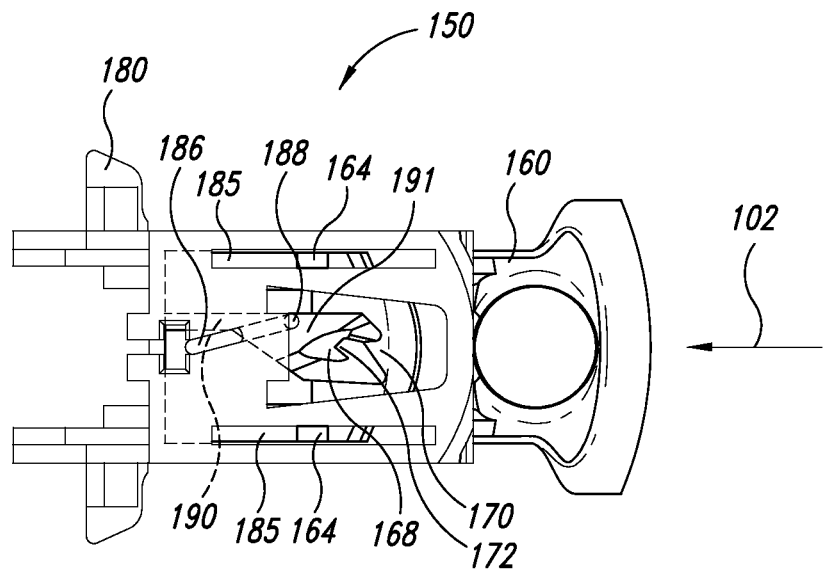

As illustrated in FIG. 7B, when an external force is applied to the lock member 160 to overcome the bias of the second spring 152 (not visible), the lock member 160 moves within the frame 180 in the direction labeled 102, thereby shortening the distance between the catch 168 and the distal end 188 of the latch 186. Specifically, FIG. 7B shows the distal end 188 of the latch 186 in a second position in which the distal end 188 has exited the groove 190 and remains in a region 191 to one side of the catch 168.

Figure 7C:
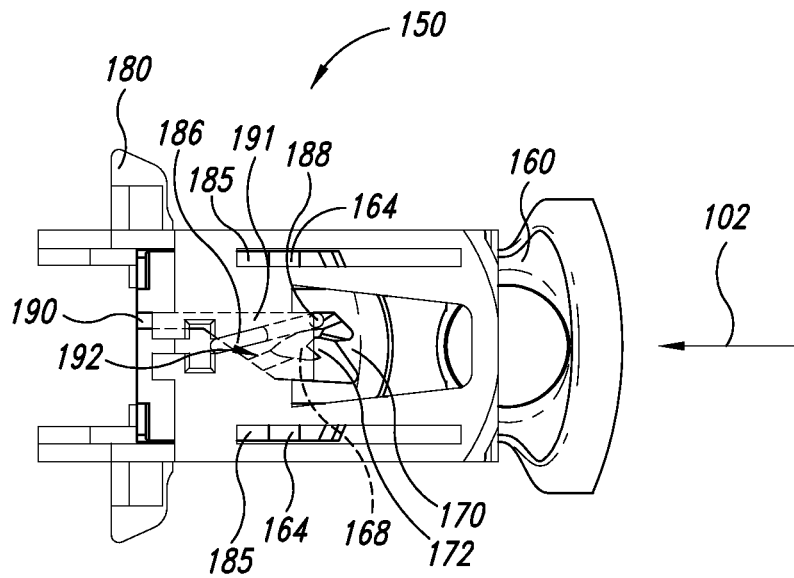

As illustrated in 7C, as force continues to be applied to the lock member 160, the lock member 160 moves further within the frame 180. The lock member 160 progresses such that the distal end 188 of the latch 186 remains in the region 191 to one side of the catch 168. The outer periphery of the catch 168 is shaped to divert or deflect the latch 188 to remain in the region 191 on the one side of the catch 168 as the lock member 160 progresses. In addition, a raised partition 192 is provided to prevent the distal end 188 from inadvertently transitioning to the other side of the catch 168. FIG. 7C shows the distal end 188 of the latch 186 in a third position in which the distal end 88 is offset to the side of the catch 168 as the lock member 160 approaches a fully depressed configuration.

Figure 7D:
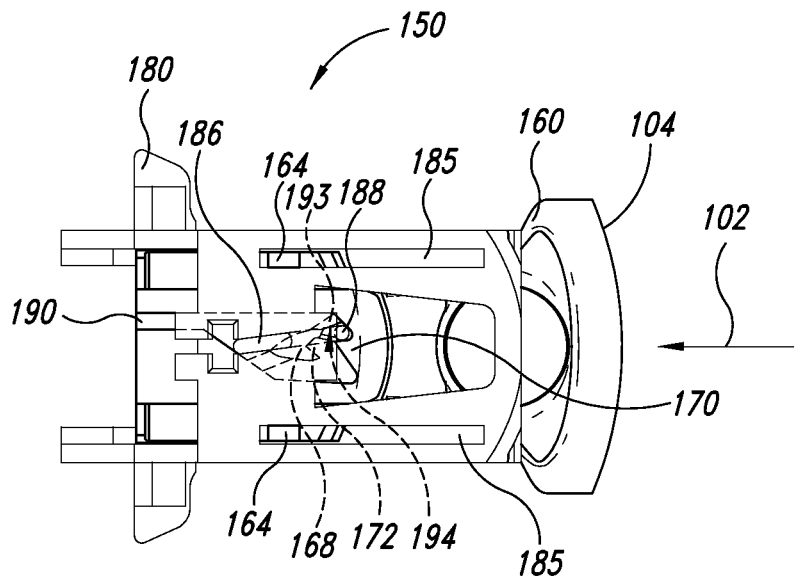
Figure 7E:
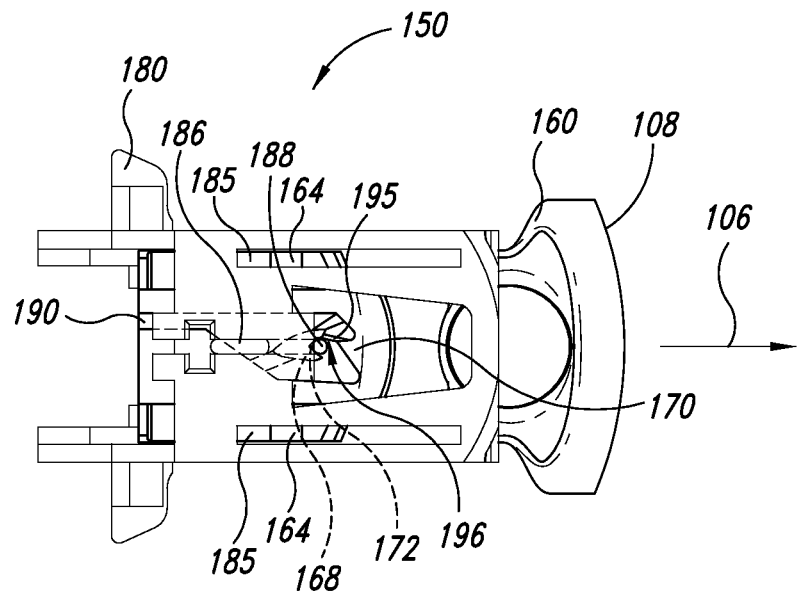

As illustrated in 7D, as force continues to be applied to the lock member 60, the lock member 160 moves still further within the frame 180. The lock member 160 continues to progress such that the distal end 188 of the latch 186 is urged away from a central plane P of the lock member 160 by a first ramp portion 193 as the lock member 160 approaches a fully or almost fully depressed configuration. The distal end 188 of the latch 168 then drops into a depressed region on the other side of a raised partition 194. FIG. 7D shows the distal end 188 of the latch 186 in a fourth position in which the distal end 188 has crossed the partition 194 and in which the lock member 160 is in an approximately fully depressed configuration 104.

Figure 7F:
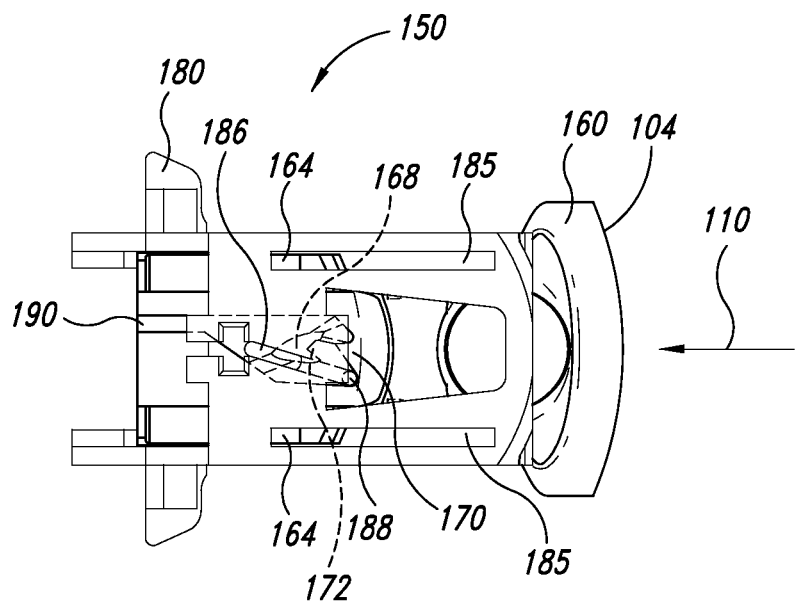

As illustrated in 7E, as force is removed from the lock member 160, the lock member 160 is biased back towards the fully extended position 100 as indicated by the arrow labeled 106. As the lock member 160 moves back towards the extended position 100, the latch 186 is led towards a seat portion 172 of the catch 168. Ultimately, the distal end 188 of the latch 186 is urged away from the center plane P by another ramp 195 and then drops into another region delineated by another raised partition 196. The distal end 188 and the latch 186 comes to rest on the seat portion 172 under the bias of the spring 152 between the lock member 160 and the frame 180. The bias applied to the lock member 160 securely seats the latch 186 in the catch portion 172. This position is referred to as the latched position or latched configuration. In the latched configuration, the lock member 160 is held at an intermediate position 108 corresponding to the unlocked position U discussed earlier. The intermediate position 108 is between the fully extended position 100 (FIG. 7A) and the fully or substantially fully depressed position 104 (FIGS. 7D and 7F).

As illustrated in 7F, as force is reapplied to the lock member 160, the lock member 160 moves further within the frame 180 until the lock member 160 again reaches the fully or substantially fully depressed position 104. This time, as the lock member 160 is fully depressed, a diverting portion 170 of the lock member 160 causes the latch 186 to deflect towards a second side of the catch 168. For example, FIG. 7F shows the distal end 188 of the latch 186 in a sixth position in which the distal end 188 is offset to the second side of the catch 168. The diverting portion 170 of the lock member 160 displaces the latch 168 laterally to such a degree that the distal end 188 of the latch 186 is prevented from falling back into the seat portion 172 when force is released from the lock member 160 as discussed below.

Figure 7G:
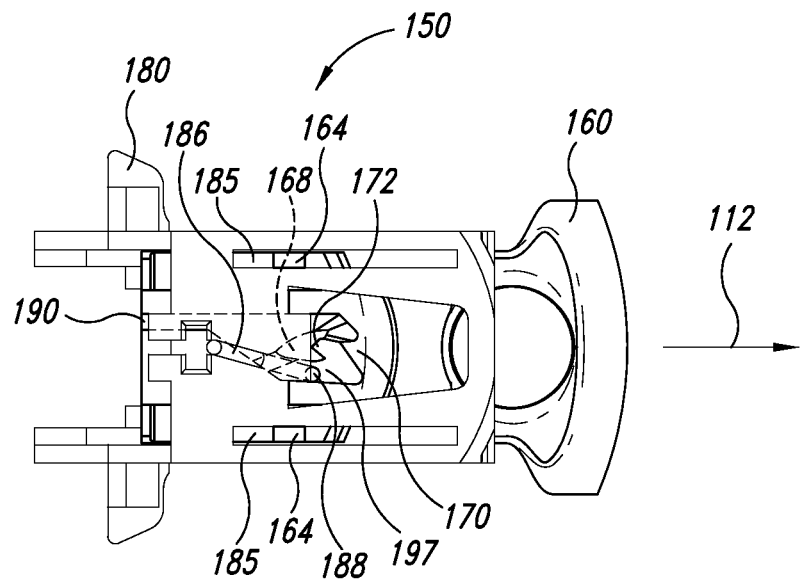

As illustrated in FIG. 7G, as force is removed from the lock member 160, the lock member 160 is biased back towards the fully extended position 100 as indicated by the arrow labeled 112. As the lock member 160 moves back towards the extended configuration 100, the distal end 188 of the latch 186 is led down a path 197 on the second side of the catch 168. For example, FIG. 7G shows the distal end 188 of the latch 186 in a seventh position in which the distal end 188 is offset to the second side of the catch 168. The catch 168 may have an outer profile that is shaped to assist in guided the latch 186 down the aforementioned path 197.

Figure 7H:
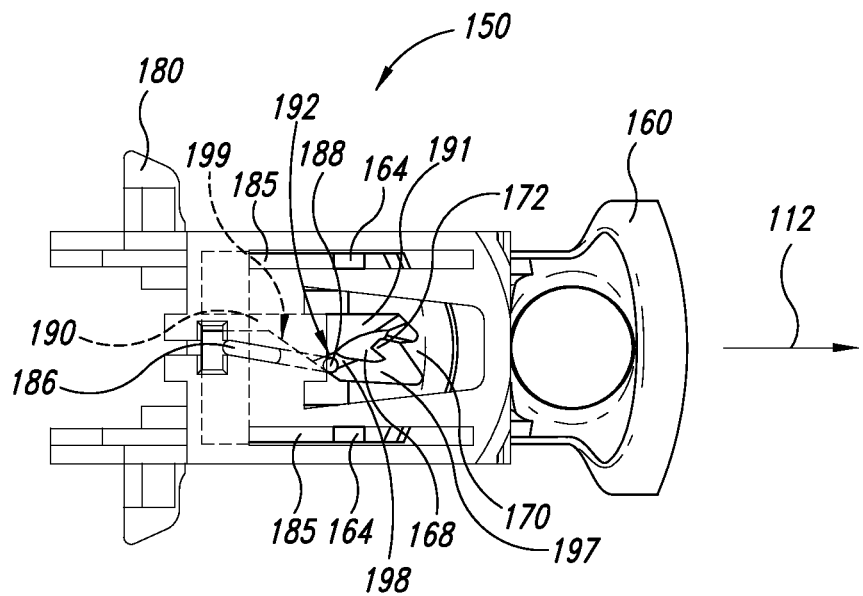

As illustrated in FIG. 7H, as the lock member 160 moves still further towards the fully extended position 100 as indicated by the arrow labeled 112, the distal end 188 of the latch 186 continues to follow the path 197 and is deflected by another ramp 198 away from the central plane as the distal end approaches the first raised partition 192. FIG. 7H shows the distal end 188 of the latch 186 in a eighth position in which the distal end 188 is about to drop over the first raised partition 192 to the region 191 on the first side of the catch 168. After the distal end 188 reaches the region 191 on the first side of the catch 168, the distal end 188 is guided by a sloped surface 199 toward the groove 190. Ultimately, the distal end 188 arrives back at the first position (FIG. 7A) in which the lock member is fully extended from the frame 180.

Figure 8:
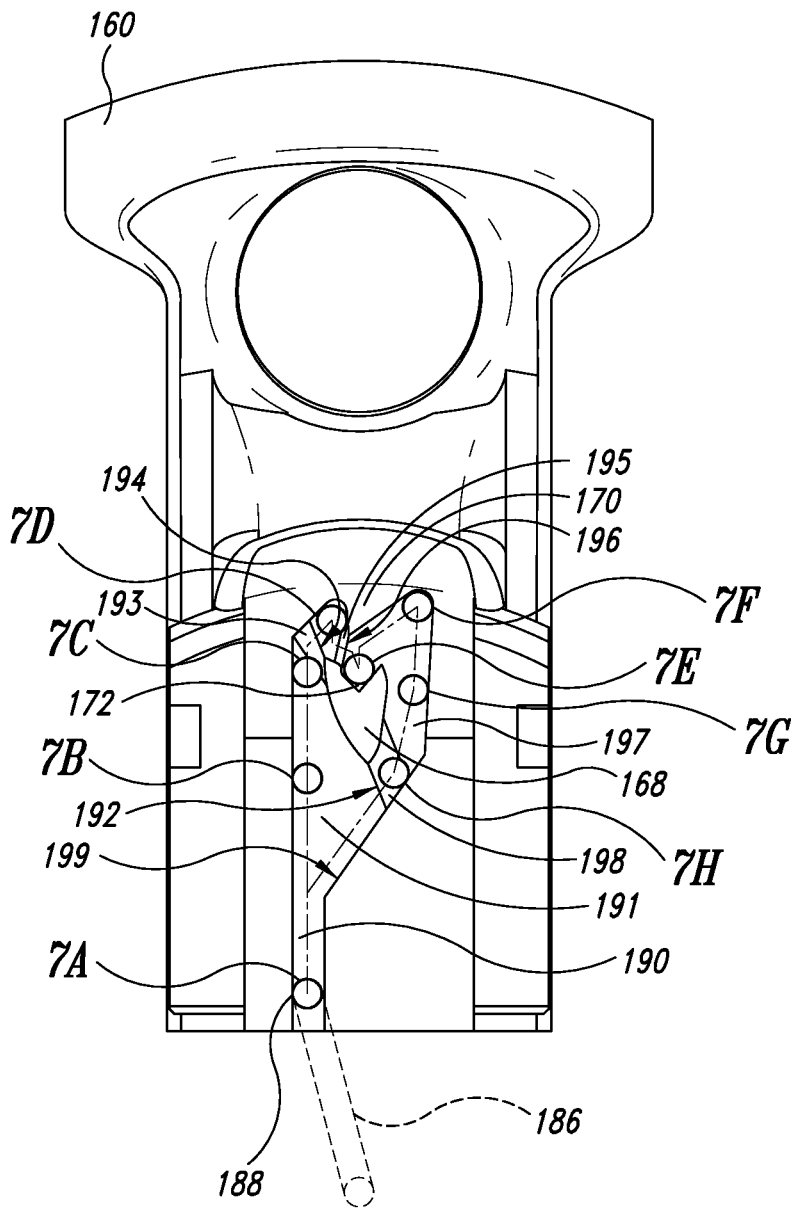
FIG. 8 is a schematic diagram of a portion of a latch of the locking mechanism of FIG. 4 shown relative to the lock member of FIG. 5 for each of the positions illustrated in FIGS. 7A-7H.

FIG. 8 is a schematic diagram of the various positions of the distal end 188 of the latch 186 discussed above overlaid on the lock member 160. As can be appreciated from this diagram, the distal end 188 of the latch 186 is configured to interoperate with the catch 168 and other structures of the lock member 160 to sequentially latch and unlatch from the seat portion 172 as the latch 186 moves along the illustrated path, for example. More specifically, from the unlatched configuration (FIG. 7A), a user can quickly and easily move the lock mechanism to the latched configuration (FIG. 7E) by simply pressing and releasing the lock member 160. Further, from the latched configuration (FIG. 7E), a user can quickly and easily move the lock mechanism 150 to the unlatched configuration (FIG. 7A) by simply pressing and releasing the lock member 160. Consequently, a user may conveniently and easily lock and unlock tongs 110 with the same repeated movement to control the degree to which the tongs 110 can expand and compress. The locking tongs 110 thus provide a particularly versatile tool for grasping or gripping food items or the like.

FIGS. 9 through 13 illustrate further details of another example embodiment of a locking mechanism 250 for tongs 210.

Figure 9:
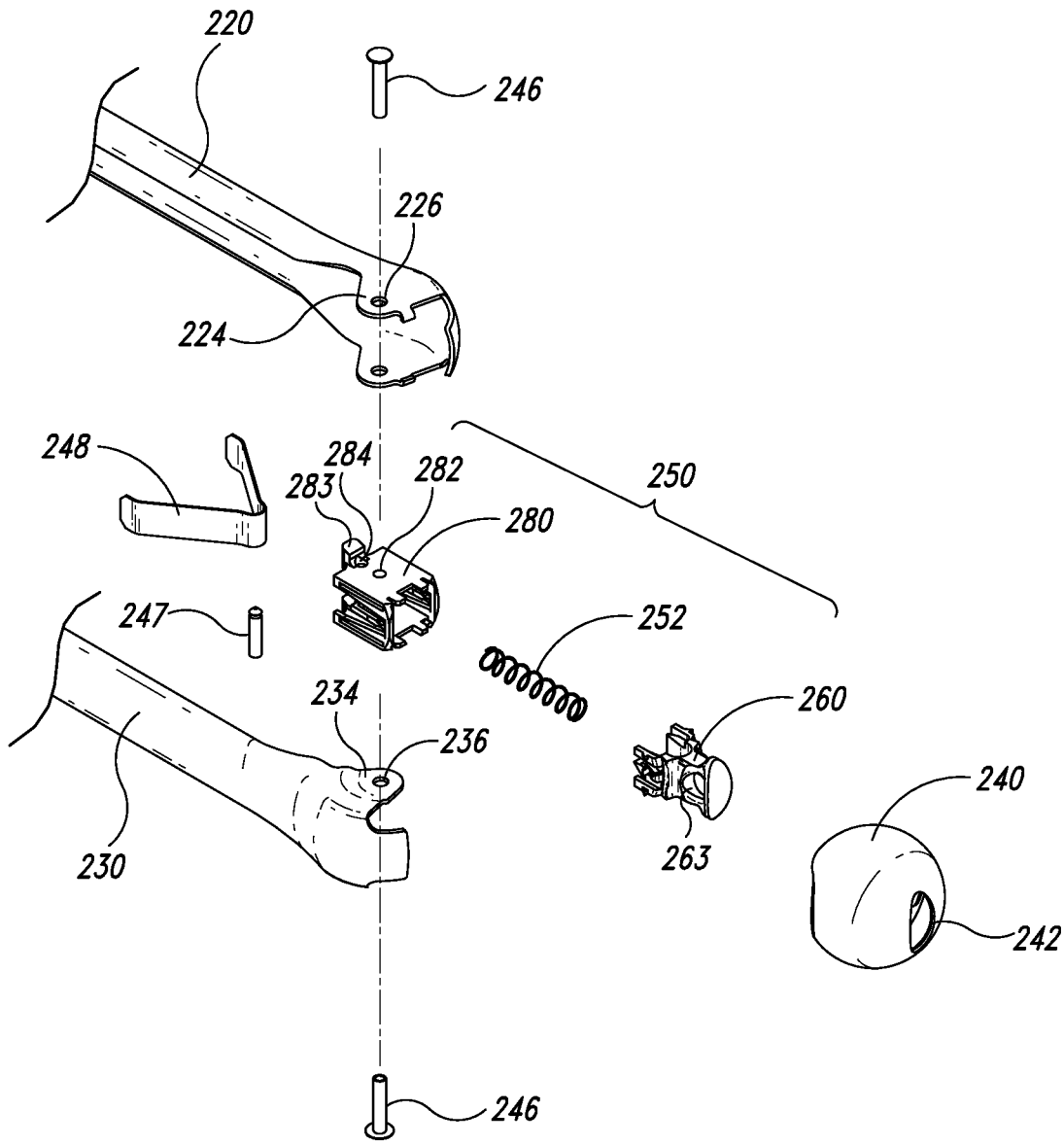
FIG. 9 is an exploded isometric view of tongs having a locking mechanism, according to another embodiment.

As can be appreciated from FIG. 9, a locking mechanism 250 is coupled to arms 220, 230 of the tongs 210 via pivot pin members 246. More particularly, the pivot pin members 246 are coupled to the arms 220, 230 via pivot apertures 226, 236 in flanged mounting portions 224, 234 thereof, and coupled to the frame 280 via a frame mounting aperture 282. Although the pin members 246 are illustrated as two mating pin components, a single pin member and associated fasteners may be used to couple the arms 220, 230 and the frame 280 together, as illustrated, for example, in the prior embodiment of locking mechanism 150.

Similar to the aforementioned embodiment, the frame 280 further includes a spring retention aperture 284 for receiving a spring retention pin 247.

The spring retention pin 247 is provided to retain a first spring 248 between the arms 220, 230 of the tongs 210 for biasing the arms 220, 230 apart throughout operation. A second spring 252 is received between the frame 280 and the lock member 260 of the locking mechanism 250. The second spring 252 biases the lock member 260 away from the frame 280 such that the lock member 260 is urged towards an extended configuration. The frame 280 also includes projections 283 that space the frame 280 within the housing 240 such that the lock member 260 aligns with an access opening 242 therein. The projections 283 may be configured to snap or click into recesses (not visible) provided in the shell of the housing 240. When assembled, the lock member 260 extends through the opening 242 when in at least one configuration so as to be accessible to a user. An aperture 263 is provided in the lock member 260 such that when the lock member 260 extends through the opening 242, the tongs 210 may be hung from a hook or the like for storage purposes.

Figure 10:
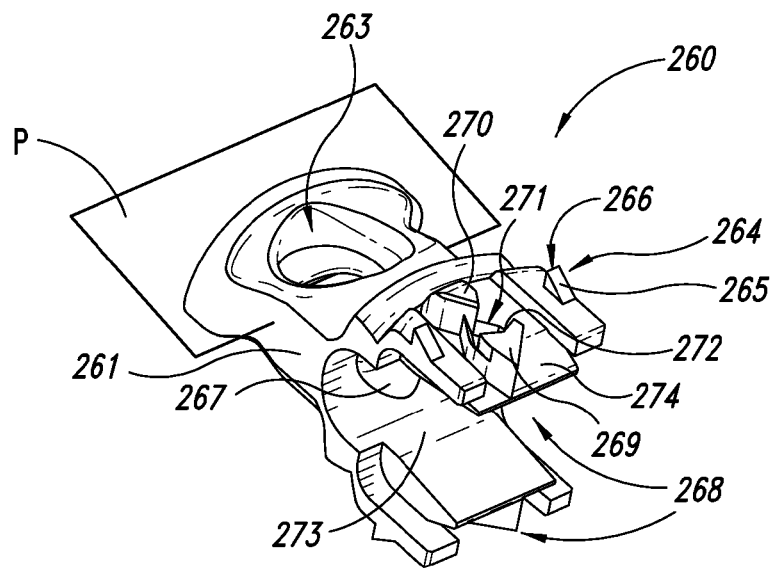
FIG. 10 is an isometric view of a lock member of the locking mechanism of the tongs of FIG. 9.
Figure 11:
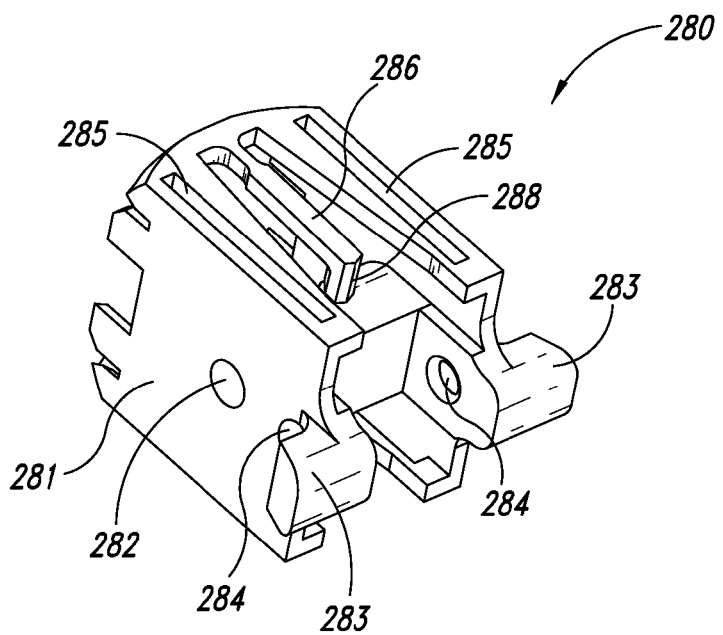
FIG. 11 is an isometric view of a frame of the locking mechanism of the tongs of FIG. 9.

FIGS. 10 and 11 show further details of the lock member 260 and the frame 280, respectively. As illustrated, a body 261 of the lock member 260 and a body 281 of the frame 280 are correspondingly sized and shaped to slidably couple together. Protrusions 264 are provided on the lock member 260 and positioned to align with correspondingly shaped slots 285 on the frame 280. In operation, the protrusions 264 ride in the slots 285 to assist in alignment of the lock member 260 with the frame 280. The protrusions 264 include sloped outer surfaces 265 to facilitate initial insertion of the lock member 260 in the frame 280. A backside 266 of the protrusions 264 is adapted to keep the lock member 260 from exiting the frame 280 once the lock member 260 and frame 280 are assembled. In the illustrated embodiment, the lock member 260 includes a spring cavity 267 for receiving one end of the second spring 252 while a corresponding spring cavity (not visible) is provided on the frame 280 for receiving the other end. In alternate embodiments, the second spring 252 may be rigidly secured to the lock member 260 and/or frame 280 by appropriate fasteners.

Figure 12A:
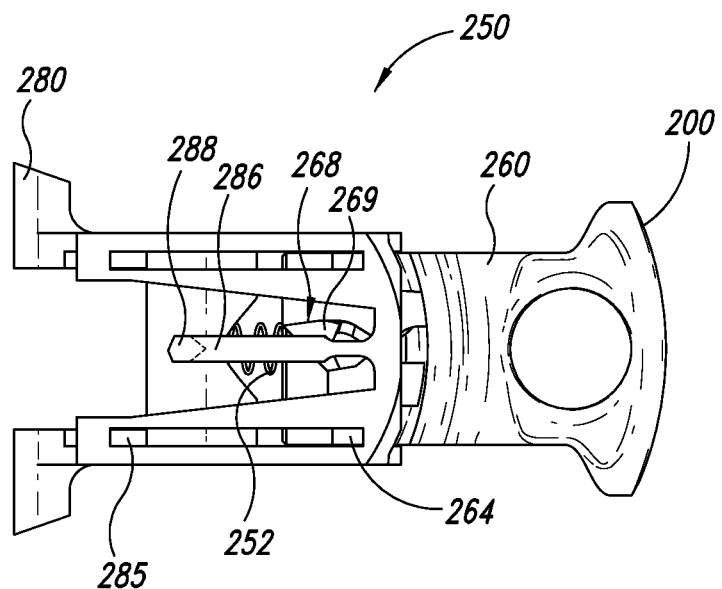
FIGS. 12A-12H are side elevational views of the lock member and the frame of the locking mechanism of the tongs of FIG. 9 shown in various positions relative to each other.

A catch 268 is located on each side of the lock member 260. In an assembled condition, each catch 268 aligns and interoperates with a respective elongated flexible latch 286 of the frame 280 to transition between an unlatched configuration (FIG. 12A) and a latched configuration (FIG. 12E) as the lock member 260 is sequentially pressed and released by a user. The catch 268 includes a first diverting portion 269 and a second diverting portion 270, each diverting portion 269, 270 including sloped and/or curvilinear surfaces for directing or deforming the distal end 288 of the latch 286 to and from an equilibrium position during the latching and unlatching process. The diverter 268 also includes a cavity 271 and a seat portion 272 to temporarily receive and retain the distal end 288 of the latch 286 in the latched configuration (FIG. 12E). The diverter 268 further includes a partition structure 273 for delineating the cavity 271 and guiding the distal end 288 of the latch 286 along a side of the diverter 268 during a portion of the latching and unlatching process. A ramp structure 274 is also provided on each side of the lock member 260 to deform or deflect the latch 286 away from a central plane P of lock member 260 during operation. Although the illustrated lock member 260 includes two catches 268, one on each side, in other embodiments the lock member 260 may include more or fewer catches 268. The catches 268 may be symmetric or asymmetric about the central plane P. The number of latches 286 of the frame 280 may also vary in number and location to correspond with one or more catches 268 of the lock member 260.

Further operational details of the locking mechanism 250 are discussed with reference to FIGS. 12A-12H. As illustrated in FIG. 12A, the lock member 260 is initially biased to a fully extended position 200 in which protrusions 264 of the lock member 260 are located at an extreme end of the slots 285 of the frame 280. In this position, the catch 268 of the lock member 260 is spaced from a distal end 288 of the latch 286 and the latch 286 remains in a state of equilibrium. This is referred to as the unlatched position or unlatched configuration and corresponds to the locked position L of the locking mechanism 250.

Figure 12B:
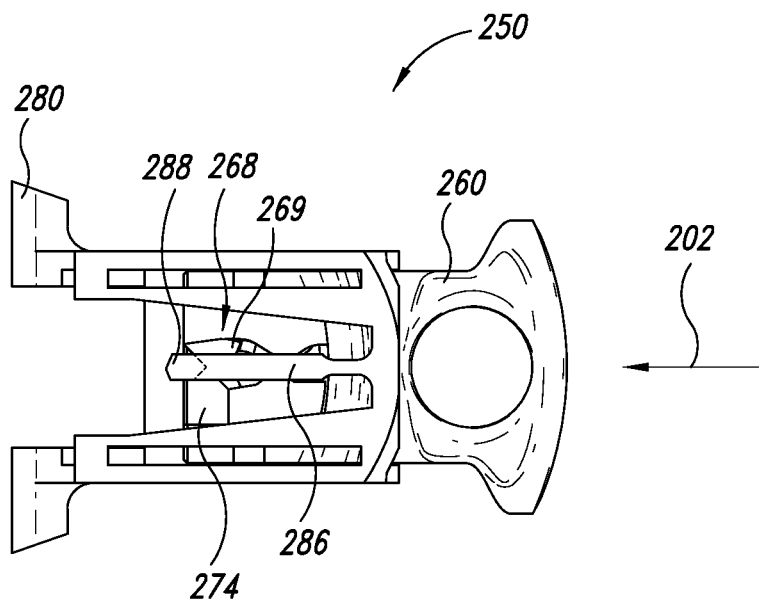

As illustrated in FIG. 12B, when an external force is applied to the lock member 260 to overcome the bias of the second spring 252, the lock member 260 moves within the frame 280 in the direction labeled 202, thereby shortening the distance between the catch 268 and the distal end 288 of the latch 286. Specifically, FIG. 12B shows the distal end 288 of the latch 286 in a second position in which the distal end 288 is just engaging a first diverting portion 269 of the catch 268.

Figure 12C:
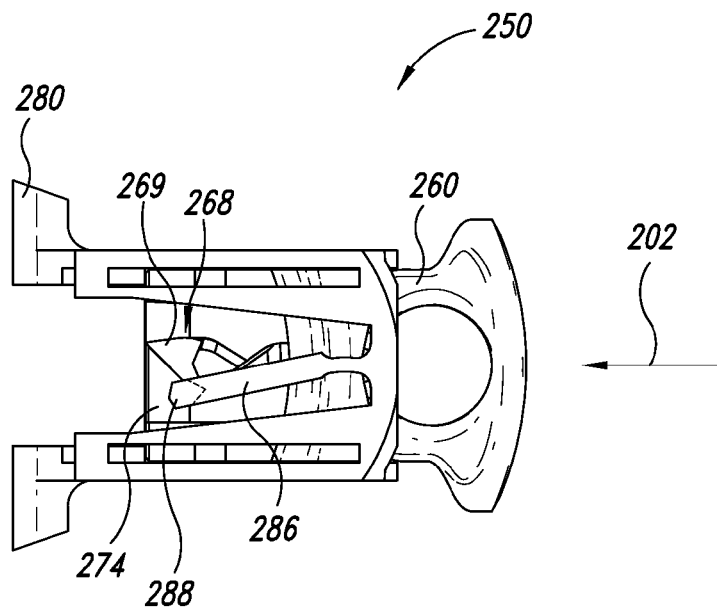

As illustrated in 12C, as force continues to be applied to the lock member 260, the lock member 260 moves further within the frame 280. The lock member 260 progresses such that a first diverting portion 269 of the catch 268 causes the latch 286 to deform or deflect to a first side of the catch 268. For example, FIG. 12C shows the distal end 288 of the latch 286 in a third position in which the distal end 288 is offset to the first side of the diverter 268 proximate a position of maximum deflection of the distal end 288. Furthermore, a ramp structure 274 engages the distal end 288 of the latch 286 and deforms or deflects the distal end 288 away from a central plane P of the lock member 260.

Figure 12D:
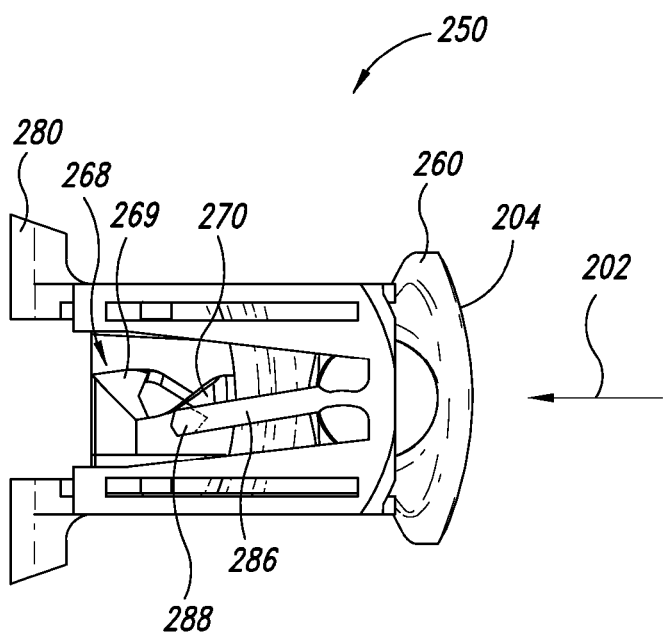
Figure 12E:
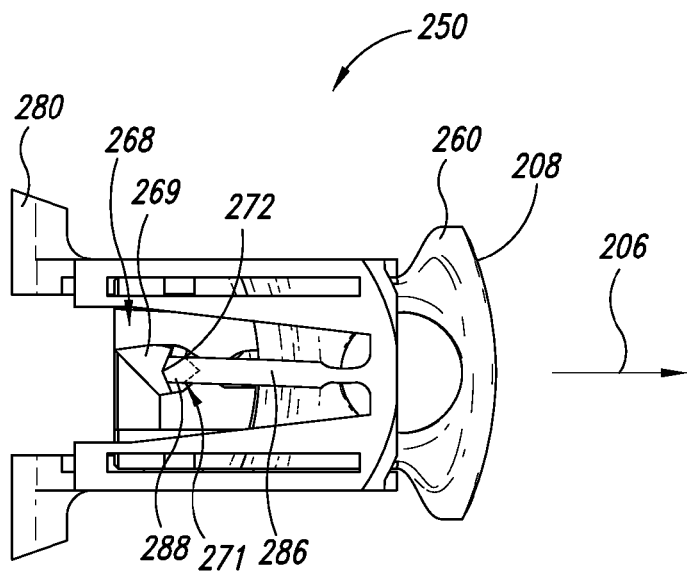

As illustrated in 12D, as force continues to be applied to the lock member 260, the lock member 260 moves still further within the frame 280. The lock member 260 continues to progress such that a second diverting portion 270 of the catch 268 catches the latch 286 and retains the latch 286 on the first side of the catch 68. FIG. 12D shows the distal end 288 of the latch 286 in a fourth position in which the distal end 288 is offset to the first side of the diverter 268 as the lock member 260 is in an approximately fully depressed configuration 204.

Figure 12F:
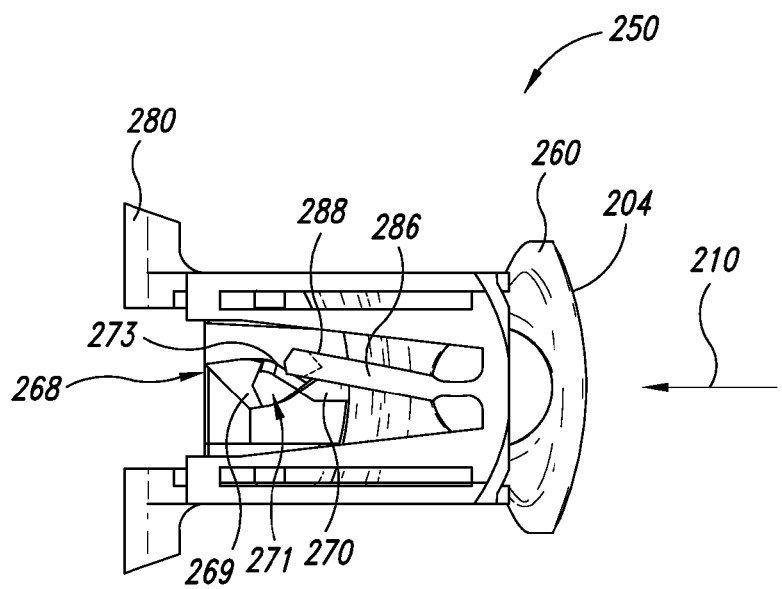

As illustrated in 12E, as force is removed from the lock member 260, the lock member 260 is biased back towards the fully extended position 200 as indicated by the arrow labeled 206. As the lock member 260 moves back towards the extended position 200, the latch 286 is led towards the equilibrium position along the second diverting portion 270 of the catch 268. Ultimately, the terminal end 288 of the latch 286 drops into the latch cavity 271 between the first and second diverting portions 269, 270 and comes to rest on the seat portion 272. The bias applied to the lock member 260 securely seats the latch 286 of the frame 280 in the seat portion 272. This position is referred to as the latched position or latched configuration. In the latched configuration, the lock member 260 is held at an intermediate position 208 corresponding to the locked position L discussed earlier. The intermediate position 208 is between the fully extended position 200 (FIG. 12A) and the fully or substantially fully depressed position 204 (FIGS. 12D and 12F).

As illustrated in 12F, as force is reapplied to the lock member 260, the lock member 260 moves further within the frame 280 until the lock member 260 again reaches the fully depressed position 204. This time, as the lock member 260 is fully depressed, the second diverting portion 270 causes the latch 286 to deform or deflect towards a second side of the catch 68. For example, FIG. 12F shows the distal end 288 of the latch 286 in a sixth position in which the distal end 288 is offset slightly to the second side of the diverter 268. As the distal end 288 of the latch 286 moves towards this sixth position, the distal end 288 rides up the partition 273 of the catch 268 and out of the cavity 271. The distal end 288 is ultimately offset or displaced to a far side of the partition 273 away from the cavity 271. In this manner, the distal end 288 of the latch 286 is prevented from falling back into the cavity 271 when force is released from the lock member 260 as discussed below.

Figure 12G:
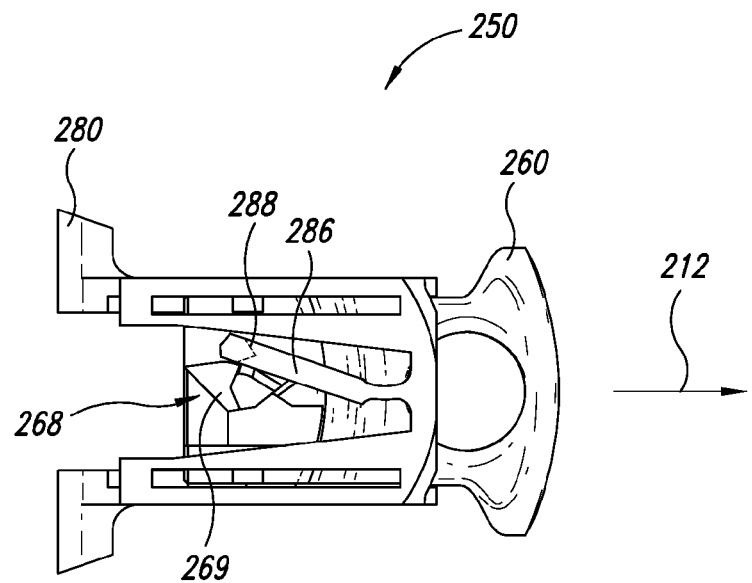

As illustrated in FIG. 12G, as force is removed from the lock member 260, the lock member 260 is biased back towards the fully extended position 200 as indicated by the arrow labeled 212. As the lock member 260 moves back towards the extended configuration 200, the latch 286 is initially led further away from the diverter 268 by the first diverting portion 269. FIG. 12G shows the distal end 288 of the latch 286 in a seventh position in which the distal end 288 is offset to the second side of the diverter 268 to approximately a position of maximum deflection of the distal end 288.

Figure 12H:
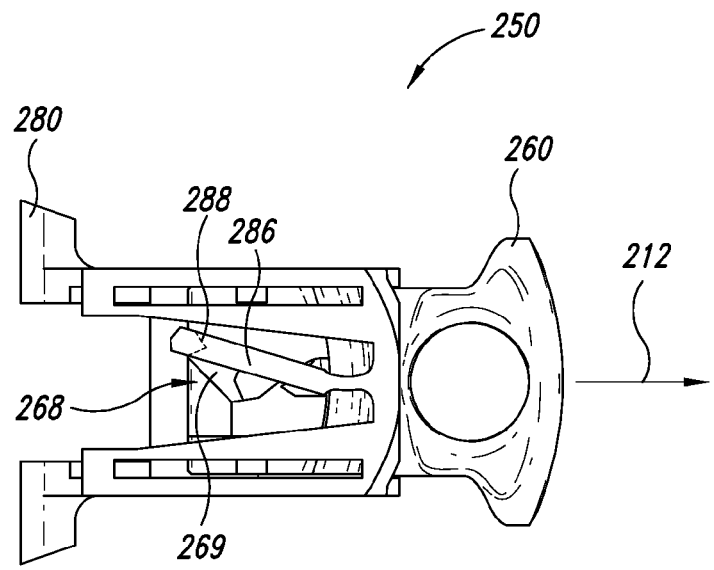

As illustrated in FIG. 12H, as the lock member 260 moves still further towards the fully extended position 200 as indicated by the arrow labeled 212, the distal end 288 of the latch 286 continues to trace the first diverting portion 269 until it reaches a point in which the latch 286 is allowed to return to its equilibrium position. FIG. 12H shows the distal end 288 of the latch 286 in an eighth position in which the distal end 288 is about to be released from the first diverting portion 269.

Figure 13:
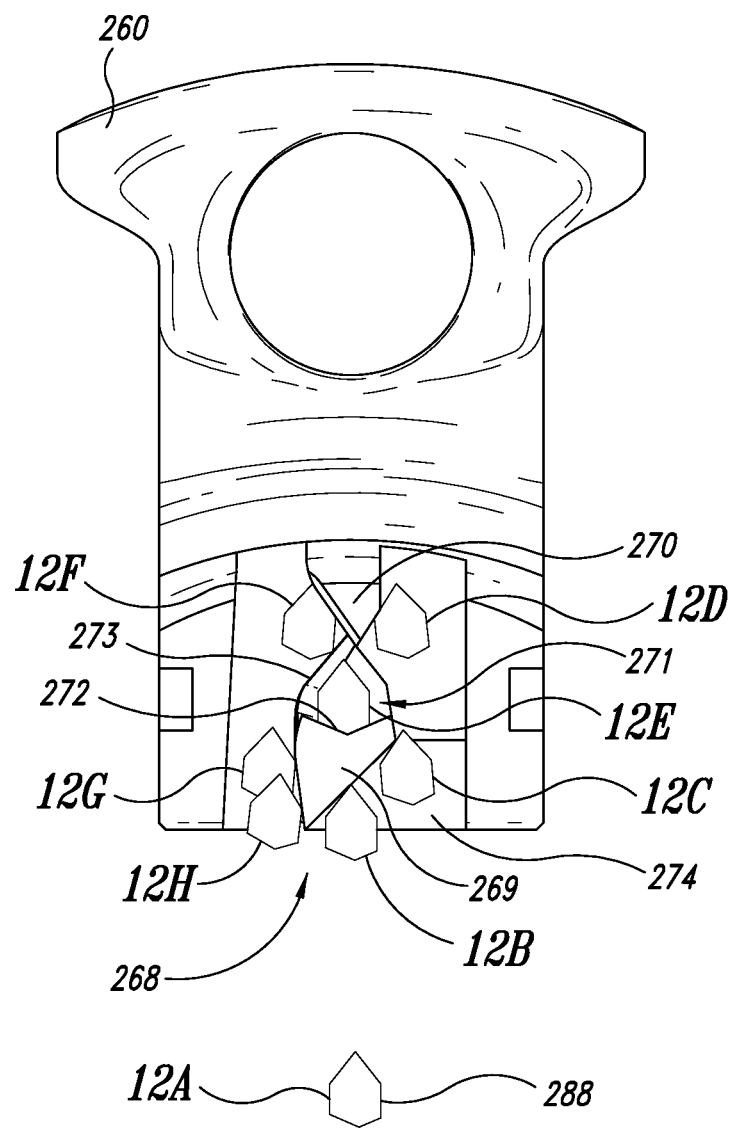
FIG. 13 is a schematic diagram of a portion of a latch of the frame of FIG. 11 shown relative to the lock member of FIG. 10 for each of the positions illustrated in FIGS. 12A-12H.

FIG. 13 is a schematic diagram of the various positions of the distal end 288 of the latch 286 discussed above overlaid on the lock member 260. As can be appreciated from this diagram, the distal end 288 of the latch 286 is configured to interoperate with the catch 268 to sequentially latch and unlatch from the seat portion 272 as the latch 286 weaves along the illustrated path. More specifically, from the unlatched configuration (FIG. 12A), a user can quickly and easily move the lock mechanism to the latched configuration (FIG. 12E) by simply pressing and releasing the lock member 260. Further, from the latched configuration (FIG. 12E), a user can quickly and easily move the lock mechanism to the unlatched configuration (FIG. 12A) by simply pressing and releasing the lock member 260. Consequently, a user may conveniently and easily lock and unlock tongs 210 with the same repeated movement to control the degree to which the tongs 210 can expand and compress.

Although embodiments of the locking mechanism disclosed herein have been described in connection with tongs and food handling tools, it will be apparent to those skilled in the art that such mechanisms and aspects of the same may be applied to a wide range of equipment and devices and are thus by no means limited to tongs or food handling tools.

Similarly, one of ordinary skill in the art, having reviewed this disclosure, will appreciate that there are other assemblies that could be substituted for temporarily latching the lock member in the locked position L and unlocked position U.

Moreover, the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. Locking tongs, comprising:
   a pair of elongated arms coupled together to move between a compressed configuration in which a distal end of each arm is relatively close to the other and an expanded configuration in which the distal end of each arm is relatively far apart from the other; and
   a locking mechanism including a frame, a lock member, a latch and a spring to bias the lock member away from the frame, the lock member movably coupled to the frame to move between a first position in which the lock member allows movement of the arms to the expanded configuration and a second position in which the lock member prevents movement of the arms beyond an intermediate configuration between the expanded and compressed configurations, the lock member being adapted to alternately guide the latch between an unlatched configuration and a latched configuration as the lock member moves to and is released from a fully depressed position, and wherein, when the latch is in the latched configuration, a distal end of the latch abuts a seat portion of the lock member to locate the lock member at an intermediate position between the fully depressed position and a fully extended position.

2. The locking tongs of claim 1 wherein the lock member includes a partition for preventing the distal end of the latch from retreating when the latch is moved away from the seat portion of the lock member.

3. The locking tongs of claim 2 wherein the lock member includes a catch that is configured to guide or keep the latch to a first side of the catch when the lock member moves from the fully extended position to the fully depressed configuration and guide the latch towards the seat portion when the lock member is released therefrom.

4. The locking tongs of claim 3 wherein the lock member includes a ramp for displacing the distal end of the latch away from a central plane of the lock member as the latch is guided to the first side of the catch.

5. The locking tongs of claim 3 wherein the lock member includes a ramp for displacing the distal end of the latch away from a central plane of the lock member as the lock member approaches the fully extended position.

6. The locking tongs of claim 3 wherein the lock member includes a diverting portion that is adapted to guide the latch away from the first side of the catch when the lock member moves from the intermediate position to the fully depressed position.

7. The locking tongs of claim 3 wherein the lock member includes a second partition to prevent the latch from returning to the intermediate position after the latch is guided away from the first side of the catch.

8. Locking tongs, comprising:
a pair of elongated arms coupled together to move between a compressed configuration in which a distal end of each arm is relatively close to the other and an expanded configuration in which the distal end of each arm is relatively far apart from the other; and
a locking mechanism including a frame, a lock member, a latch and a spring to bias the lock member away from the frame, the lock member movably coupled to the frame to move between a first position in which the lock member allows movement of the arms to the expanded configuration and a second position in which the lock member prevents movement of the arms beyond an intermediate configuration between the expanded and compressed configurations, the lock member being adapted to alternately guide the latch between an unlatched configuration and a latched configuration as the lock member moves to and is released from a fully depressed position, and wherein the latch of the locking mechanism is an integral portion of the frame.

9. Locking tongs, comprising:
a pair of elongated arms coupled together to move between a compressed configuration in which a distal end of each arm is relatively close to the other and an expanded configuration in which the distal end of each arm is relatively far apart from the other; and
a locking mechanism including a frame, a lock member, a latch and a spring to bias the lock member away from the frame, the lock member movably coupled to the frame to move between a first position in which the lock member allows movement of the arms to the expanded configuration and a second position in which the lock member prevents movement of the arms beyond an intermediate configuration between the expanded and compressed configurations, the lock member being adapted to alternately guide the latch between an unlatched configuration and a latched configuration as the lock member moves to and is released from a fully depressed position, and wherein the latch of the locking mechanism is coupled to the frame.

10. Locking tongs, comprising:
a pair of elongated arms coupled together to move between a compressed configuration in which a distal end of each arm is relatively close to the other and an expanded configuration in which the distal end of each arm is relatively far apart from the other; and
a locking mechanism including a frame, a lock member and a spring that is received between the frame and the lock member to bias the lock member away from the frame, the lock member movably coupled to the frame to move between a first position in which the lock member allows movement of the arms to the expanded configuration and a second position in which the lock member prevents movement of the arms beyond an intermediate configuration between the expanded and compressed configurations.

11. Locking tongs, comprising:
a pair of elongated arms coupled together to move between a compressed configuration in which a distal end of each arm is relatively close to the other and an expanded configuration in which the distal end of each arm is relatively far apart from the other; and
a locking mechanism including a frame, a lock member and a spring to bias the lock member away from the frame in a direction from a working end of the locking tongs toward a rear end of the locking tongs, the lock member movably coupled to the frame to move between a first position in which the lock member allows movement of the arms to the expanded configuration and a second position in which the lock member prevents movement of the arms beyond an intermediate configuration between the expanded and compressed configurations.

* * * * *